(12) United States Patent
Ryu et al.

(10) Patent No.: US 10,957,955 B2
(45) Date of Patent: Mar. 23, 2021

(54) BATTERY MODULE AND BATTERY PACK INCLUDING THE SAME

(71) Applicant: LG CHEM, LTD., Seoul (KR)

(72) Inventors: Jae-Uk Ryu, Daejeon (KR); Ji-Su Yoon, Daejeon (KR); Dal-Mo Kang, Daejeon (KR); Jeong-O Mun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 153 days.

(21) Appl. No.: 16/337,771

(22) PCT Filed: Jan. 5, 2018

(86) PCT No.: PCT/KR2018/000275
§ 371 (c)(1),
(2) Date: Mar. 28, 2019

(87) PCT Pub. No.: WO2018/186562
PCT Pub. Date: Oct. 11, 2018

(65) Prior Publication Data
US 2020/0028131 A1    Jan. 23, 2020

(30) Foreign Application Priority Data
Apr. 7, 2017 (KR) .................. 10-2017-0045405

(51) Int. Cl.
*H01M 10/613* (2014.01)
*H01M 50/20* (2021.01)
*H01M 10/625* (2014.01)

(52) U.S. Cl.
CPC ......... *H01M 50/20* (2021.01); *H01M 10/613* (2015.04); *H01M 10/625* (2015.04)

(58) Field of Classification Search
None
See application file for complete search history.

(56) References Cited

U.S. PATENT DOCUMENTS

| | | |
|---|---|---|
| 2007/0026300 A1 | 2/2007 | Lee et al. |
| 2009/0061305 A1 | 3/2009 | Nishida et al. |
| 2014/0363710 A1 | 12/2014 | Lee et al. |
| 2015/0188203 A1 | 7/2015 | Enomoto et al. |

(Continued)

FOREIGN PATENT DOCUMENTS

| | | | |
|---|---|---|---|
| JP | 9-266016 A | | 10/1997 |
| JP | H09266016 | * | 10/1997 |

(Continued)

OTHER PUBLICATIONS

Machine Translation of JPH09-266016 (Year: 1997).*
International Search Report (PCT/ISA/210) issued in PCT/KR2018/000275, dated May 3, 2018.

*Primary Examiner* — Wyatt P McConnell
(74) *Attorney, Agent, or Firm* — Birch, Stewart, Kolasch & Birch, LLP

(57) ABSTRACT

A battery module including a case having a wall disposed therein to form a channel along which a fluid circulates; and a plurality of battery cells disposed in the case, wherein the wall is disposed between a pair of neighboring battery cells among the plurality of battery cells, and the fluid flows in through an inlet of the case, circulates between the plurality of battery cells along the wall, and flows out through an outlet of the case.

10 Claims, 4 Drawing Sheets

(56) References Cited

U.S. PATENT DOCUMENTS

| | | |
|---|---|---|
| 2016/0079640 A1 | 3/2016 | Kim |
| 2016/0226116 A1 | 8/2016 | Noh et al. |
| 2017/0033419 A1 | 2/2017 | Eom et al. |

FOREIGN PATENT DOCUMENTS

| | | |
|---|---|---|
| JP | 2001-60466 A | 3/2001 |
| JP | 2003-17131 A | 1/2003 |
| JP | 2009-59473 A | 3/2009 |
| JP | 2014-60088 A | 4/2014 |
| KR | 10-2007-0013455 A | 1/2007 |
| KR | 10-2013-0061895 A | 6/2013 |
| KR | 10-2014-0057696 A | 5/2014 |
| KR | 10-2015-0118375 A | 10/2015 |
| KR | 10-2016-0030724 A | 3/2016 |
| KR | 10-2016-0094226 A | 8/2016 |

\* cited by examiner

BATTERY MODULE AND BATTERY PACK INCLUDING THE SAME

TECHNICAL FIELD

The present application claims priority to Korean Patent Application No. 10-2017-0045405 filed on Apr. 7, 2017 in the Republic of Korea, the disclosures of which are incorporated herein by reference.

The present disclosure relates to a battery module and a battery pack including the battery module, and more particularly, to a battery module capable of improving the cooling efficiency and a battery pack including the battery module.

BACKGROUND ART

As technology development and demand for a mobile device have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

The lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and an outer member, that is a battery case, which seals and receives the electrode assembly together with an electrolyte solution.

The lithium secondary battery includes a positive electrode, a negative electrode, and a separator interposed therebetween and an electrolyte. Depending on which material is used for the positive electrode active material and the negative electrode active material, the lithium secondary battery is classified into a lithium ion battery (LIB) and a polymer lithium ion battery (PLIB). Generally, an electrode of the lithium secondary battery is prepared by applying the positive or negative electrode active material to a current collector made of aluminum or copper sheet, mesh, film, foil, or the like and then drying the same.

The lithium secondary battery is currently in the limelight due to its advantages such as high operating voltage and high energy density, but it is one of important tasks to cool the lithium secondary battery since heat is generated while the lithium secondary battery is being charged or used.

In relation to the prior art, Korean Unexamined Patent Publication No. 10-2014-0057696 discloses a structure in which an insulating liquid is filled in a battery case and is circulated to cool a battery module. However, in this document, battery cells are disposed at the center of the battery case, and the flow of the insulating liquid is disturbed since the insulating liquid collides with the battery cells while circulating. Thus, the insulating liquid may not circulate smoothly, and thus the cooling performance of the entire battery module is poor.

DISCLOSURE

Technical Problem

The present disclosure is directed to providing a battery module that allows a fluid to smoothly circulate in a case, and a battery pack including the battery module.

The present disclosure is also directed to providing a battery module that may have improved cooling performance since the fluid is in direct contact with the battery cell, and a battery pack including the battery module.

The present disclosure is also directed to providing a battery module that may have a reduced entire volume and an improved energy density, and a battery pack including the battery module.

Technical Solution

In one aspect of the present disclosure, there is provided a battery module, comprising: a case having a wall disposed therein to form a channel along which a fluid circulates; and a plurality of battery cells disposed in the case, wherein the wall is disposed between a pair of neighboring battery cells among the plurality of battery cells, and the fluid flows in through an inlet of the case, circulates between the plurality of battery cells along the wall, and flows out through an outlet of the case.

Also, the wall may include a first wall extending from a first side of the case and spaced apart from a second side of the case, which is opposite to the first side.

In addition, the wall may include a second wall extending from the second side of the case and spaced apart from first side of the case.

Also, the first wall and the second wall may be spaced apart by a preset gap.

In addition, the first wall and the second wall may be provided in plural, and the first walls and the second walls may be disposed alternately.

Also, the battery module may further comprise a connection member configured to connect neighboring battery cells to each other and having a rounded portion at a region that comes into contact with the fluid.

Meanwhile, in another aspect of the present disclosure, there is also provided a battery pack including the battery module described above, and there is also provided a vehicle including the battery module.

Advantageous Effects

According to the embodiments of the present disclosure, a fluid may smoothly circulate in the case along a channel formed at a wall disposed in the case.

In addition, since the fluid is in direct contact with the battery cell while smoothly circulating in the case, it is possible to improve the cooling performance.

Moreover, since a heat transfer member such as a cooling plate and a thermal interface material (TIM) is not used, the overall volume of the battery module is reduced, and battery cells may be additionally disposed at the position where the heat transfer member is used, thereby improving the energy density.

BEST MODE

Figure 1:
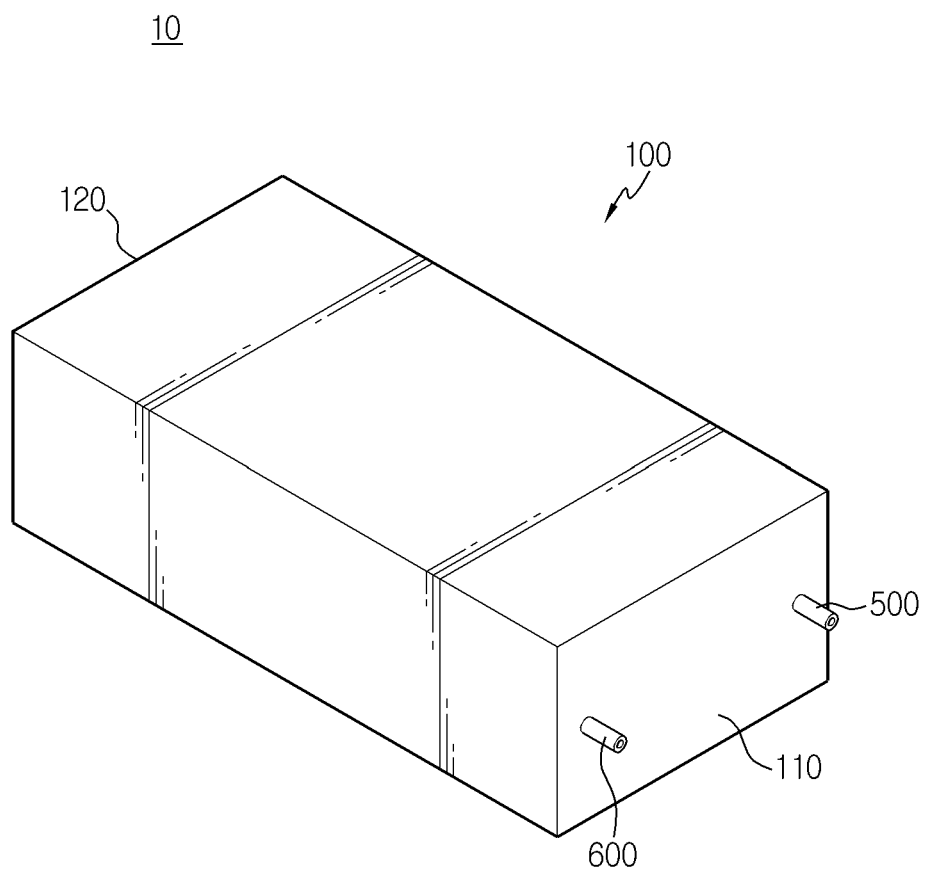
FIG. 1 is a perspective view showing an entire battery module according to the first embodiment of the present disclosure.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part of the element may be exaggerated, omitted, or schematically illustrated for convenience and clarity of a description. Thus, the size of each element does not entirely reflect the actual size of the element. A detailed description of well-known functions or elements associated with the present disclosure will be omitted if it unnecessarily obscures the subject matter of the present disclosure.

The term, 'combine' or 'connect' as used herein, may refer not only to a case where one member and another member are directly combined or directly connected but also a case where one member is indirectly combined with another member via a connecting member or is indirectly connected.

Figure 2:
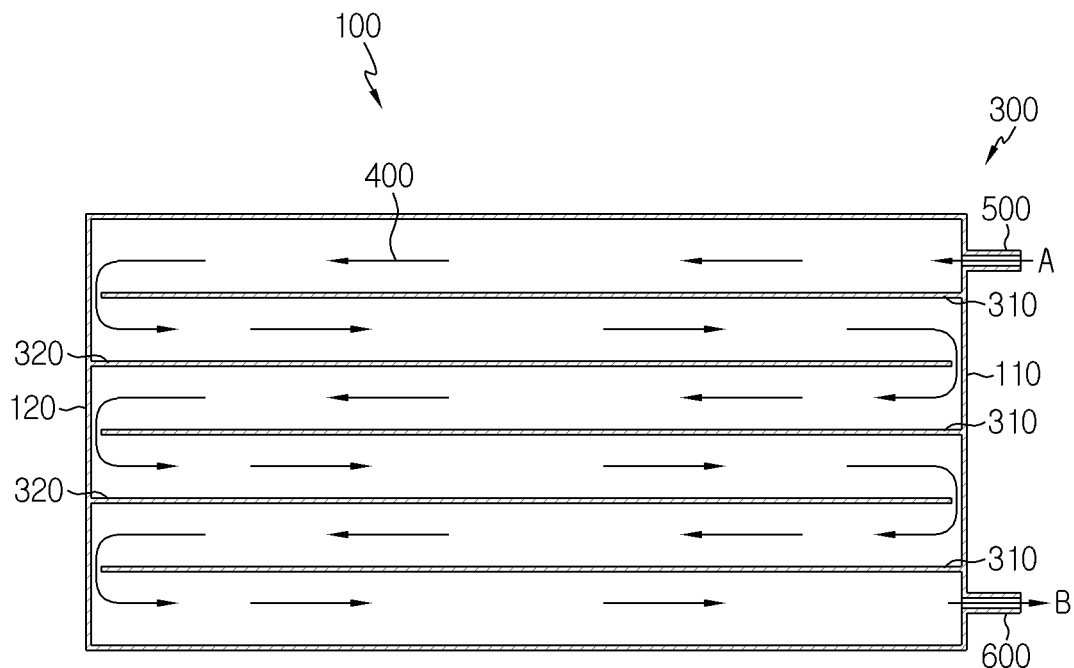
FIG. 2 is a cross-sectioned view showing that a channel is formed by disposing walls to a case employed at the battery module according to the first embodiment of the present disclosure, observed from the above.
Figure 3:
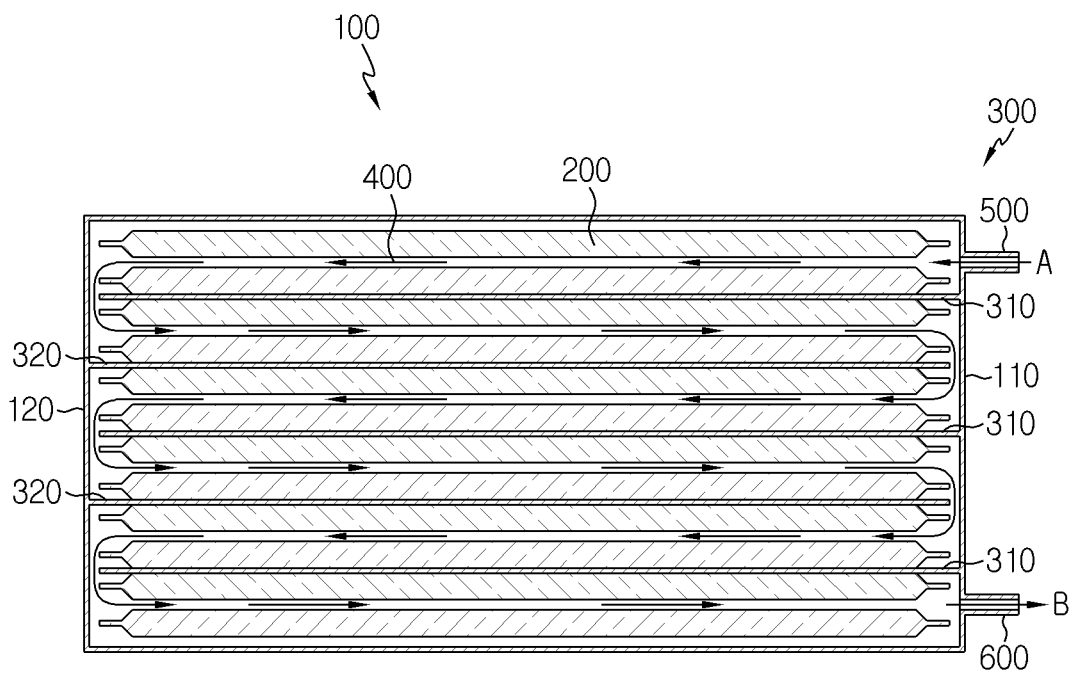
FIG. 3 is a cross-sectioned view showing the battery module according to the first embodiment of the present disclosure, observed from the above.

FIG. 1 is a perspective view showing an entire battery module according to the first embodiment of the present disclosure, FIG. 2 is a cross-sectioned view showing that a channel is formed by disposing walls to a case employed at the battery module according to the first embodiment of the present disclosure, observed from the above, and FIG. 3 is a cross-sectioned view showing the battery module according to the first embodiment of the present disclosure, observed from the above.

Referring to FIGS. 1 to 3, a battery module 10 according to the first embodiment of the present disclosure includes a case 100 and battery cells 200.

The case 100 has a channel formed therein so that a fluid may circulate therethrough. Here, the fluid may be provided in various ways to cool the battery cells 200 in contact with the battery cells 200. Hereinafter, the fluid will be described as a cooling oil 400 for convenience of explanation. However, it should be noted that the fluid is not limited to the cooling oil 400 due to the description. In addition, the channel is formed in various ways in the case 100 so that the cooling oil 400 may circulate therethrough. Referring to FIG. 2, a wall 300 is disposed inside the case 100 to form a channel capable of circulating the cooling oil 400. The wall 300 may be provided in various numbers. However, the case where one wall 300 is provided will be described later in the second embodiment, and the case where a plurality of walls 300 are provided will be described in the first embodiment.

The wall 300 is disposed inside the case 100 to partition the inside of the case 100 and has a channel therein through which the cooling oil 400 may move. Referring to FIG. 2, the wall 300 may include a first wall 310 and a second wall 320. The first wall 310 is formed to extend from one side 110 of the case and spaced apart from the other side 120 of the case, which is opposite to one side. In addition, the second wall 320 is formed to extend from the other side 120 of the case and spaced apart from one side 110 of the case, which is opposite the other side. Here, the size of the space between the wall 300 and the case 100 may be set variously. In addition, the first wall 310 and the second wall 320 may be spaced apart by a preset gap.

Referring to FIG. 3, the walls 310, 320 are disposed to be interposed between a pair of neighboring battery cells 200 among the plurality of battery cells 200, and the battery cells 200 are coupled to and supported by the walls 310, 320. That is, referring to FIGS. 2 and 3, if the cooling oil 400 moves along the first wall 310 and the second wall 320, the cooling oil 400 may come into direct contact with the battery cells 200 coupled to the wall 300, and thus the cooling oil 400 may directly cool the battery cells 200.

For example, referring to FIGS. 2 and 3, the cooling oil 400 flowing in along a direction of an arrow A through an inlet 500 of the case 100 circulates between the plurality of battery cells 200 along the wall 300 and flows out along a direction of an arrow B through an outlet 600 of the case 100. Here, since the first wall 310 is spaced apart from the other side 120 of the case, the cooling oil 400 may move through the space between the first wall 310 and the other side 120 of the case. Also, since the second wall 320 is spaced apart from one side 110 of the case, the cooling oil 400 may move through the space between the second wall 320 and one side 110 of the case.

In this way, the cooling oil 400 flowing into the case 100 through the inlet 500 of the case 100 flows along the first wall 310 and the second wall 320 to cool the battery cells 200 disposed inside the case 100, and then flows out through the outlet 600 of the case 100. In the battery module 10 according to the first embodiment of the present disclosure, the cooling oil 400 flows along the channel formed by the walls 300, different from the conventional technique, and thus the flow of the cooling oil 400 is not disturbed by the battery cells 200. Thus, the cooling oil 400 may come into direct contact with the battery cells 200 to efficiently cool the battery cells 200.

The first wall 310 and the second wall 320 may be respectively provided in the case 100 in single or in plural. Referring to FIG. 2, three first walls 310 and two second walls 320 are disposed alternately so that the cooling oil 400 may circulate as if it rotates while reciprocating between an end of one side 110 of the case and an end of the other side 120 of the case. The number of the first wall 310 and the second wall 320 may be set more variously. As shown in FIG. 2, if the total number of the first walls 310 and the second walls 320 is an odd number, the inlet 500 of the case 100 and the outlet 600 of the case 100 may be formed in the same direction. However, if the total number of the first walls 310 and the second walls 320 is an even number, the inlet 500 of the case 100 and the outlet 600 of the case 100 may be formed in different directions.

The plurality of battery cells 200 are disposed inside the case 100. The battery cells 200 are coupled to the wall 300 so that a channel through which the cooling oil 400 may circulate is formed inside the case 100, and, referring to FIG. 3, the cooling oil 400 is capable of moving between the plurality of battery cells 200.

The battery cell 200 may have various structures. The battery cell 200 may be configured so that a plurality of unit cells, in each of which a positive electrode plate, a separator and a negative electrode plate are arranged in order, or a plurality of bi-cells, in each of which a positive electrode plate, a separator, a negative electrode plate, a separator, a positive electrode plate, a separator and a negative electrode plate are arranged in order, are stacked suitable for a battery capacity.

The battery cell 200 may have an electrode lead. The electrode lead is a type of terminal that is exposed to the outside and connected to an external device, and the electrode lead may be made of a conductive material. The electrode lead may include a positive electrode lead and a negative electrode lead. The positive electrode lead and the negative electrode lead may be disposed in opposite directions with respect to the longitudinal direction of the battery cell 200, or the positive electrode lead and the negative electrode lead may be positioned in the same direction with respect to the longitudinal direction of the battery cell 200.

Figure 4:
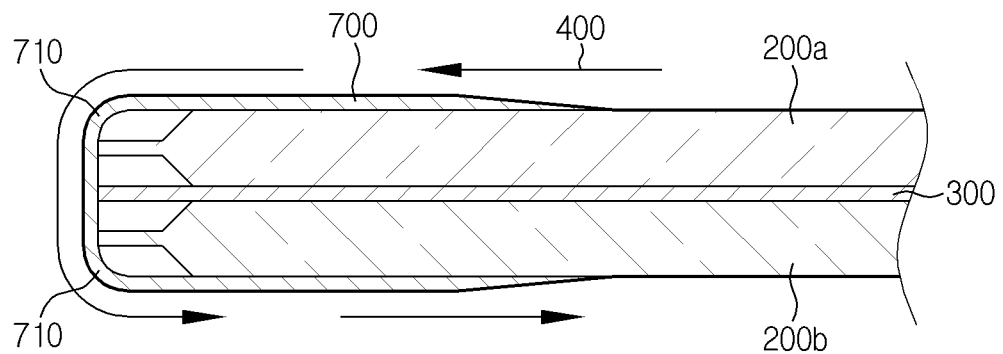
FIG. 4 is a cross-sectioned view showing that a connection member is coupled to the battery cells in the battery module according to the first embodiment of the present disclosure.

FIG. 4 is a cross-sectioned view showing that a connection member is coupled to the battery cells in the battery module according to the first embodiment of the present disclosure.

Referring to FIG. 4, a connection member 700 may connect a pair of neighboring battery cells 200a, 200b to each other, and the pair of battery cells 200a, 200b may be supported by the connection member 700. In addition, the connection member 700 may have a rounded portion 710 formed at a region in contact with the cooling oil 400. If the rounded portion 710 is formed at the connection member 700 as above, the cooling oil 400 moves along the rounded portion 710 of the connection member 700 while circulating, thereby reducing a the relative resistance. Accordingly, the cooling oil 400 may circulate more smoothly.

Hereinafter, the operation and effects of the battery module 10 according to the first embodiment of the present disclosure will be described with reference to the drawings.

Inside the case 100, the first wall 310 extending from one side 110 of the case and spaced apart from the other side 120 of the case and the second wall 320 extending from the other side 120 of the case and spaced apart from one side 110 of the case may be disposed alternately. In addition, the battery cells 200 are coupled to and supported by the wall 300. The cooling oil 400 flowing into the case 100 through the inlet 500 of the case 100 circulates along the first wall 310 and the second wall 320 and directly contacts the battery cells 200 to cool the battery cells 200, and then flows out of the case 100 through the outlet 600 of the case 100. In addition, a new cooling oil 400 may flow into the case 100 again, or the cooling oil 400 flowing out of the case 100 may be cooled through the heat transfer and then flow into the case 100 again. Meanwhile, various methods may be used to circulate the cooling oil 400, and, for example, a pump may be combined. However, the circulation method of the cooling oil 400 is not limited thereto.

Figure 5:
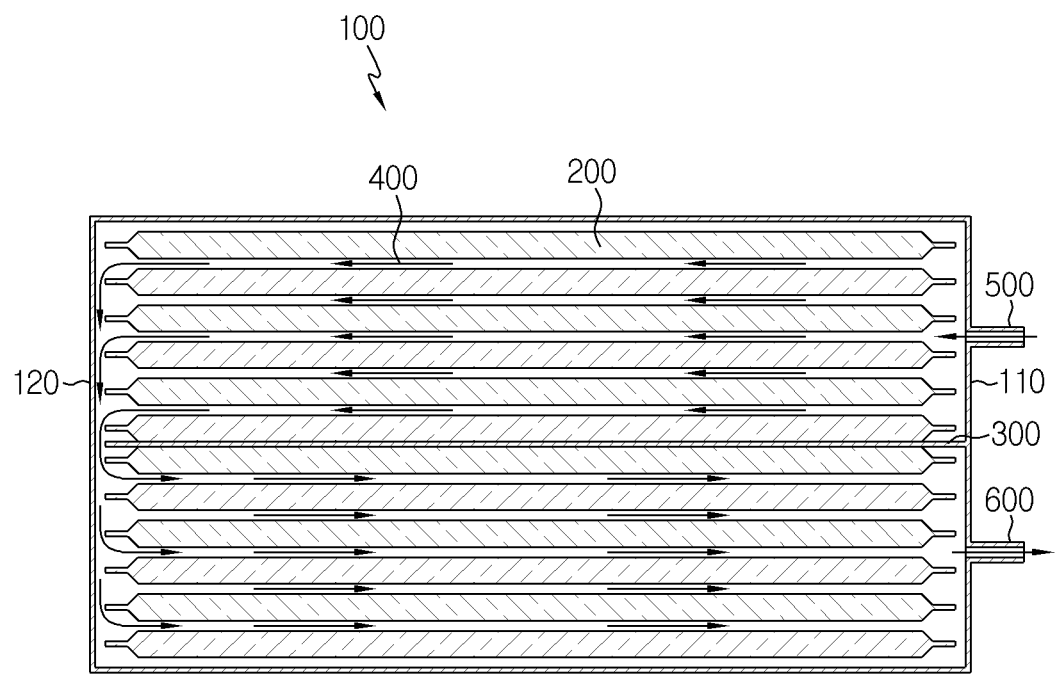
FIG. 5 is a cross-sectioned view showing a battery module according to the second embodiment of the present disclosure, observed from the above.

FIG. 5 is a cross-sectioned view showing a battery module according to the second embodiment of the present disclosure, observed from the above.

Hereinafter, the function and effect of a battery module 10 according to the second embodiment according to the present disclosure will be described with reference to the drawings, but features common to the battery module 10 according to the first embodiment of the present disclosure will not be described again in detail.

The second embodiment of the present disclosure is different from the first embodiment in the point that a single wall 300 is provided to form a channel.

Referring to FIG. 5, the cooling oil 400 flowing into the case 100 through the inlet 500 of the case 100 moves along the wall 300 to a side opposite to the inlet 500 of the case 100 through the space between the battery cells 200, and moves through the space formed between the side opposite to the inlet 500 of the case 100 and the wall 300, and flows out of the case 100 through the outlet 600 of the case 100. In this way, it is possible that the cooling oil 400 cools the battery cells 200 in direct contact thereto.

Figure 6:
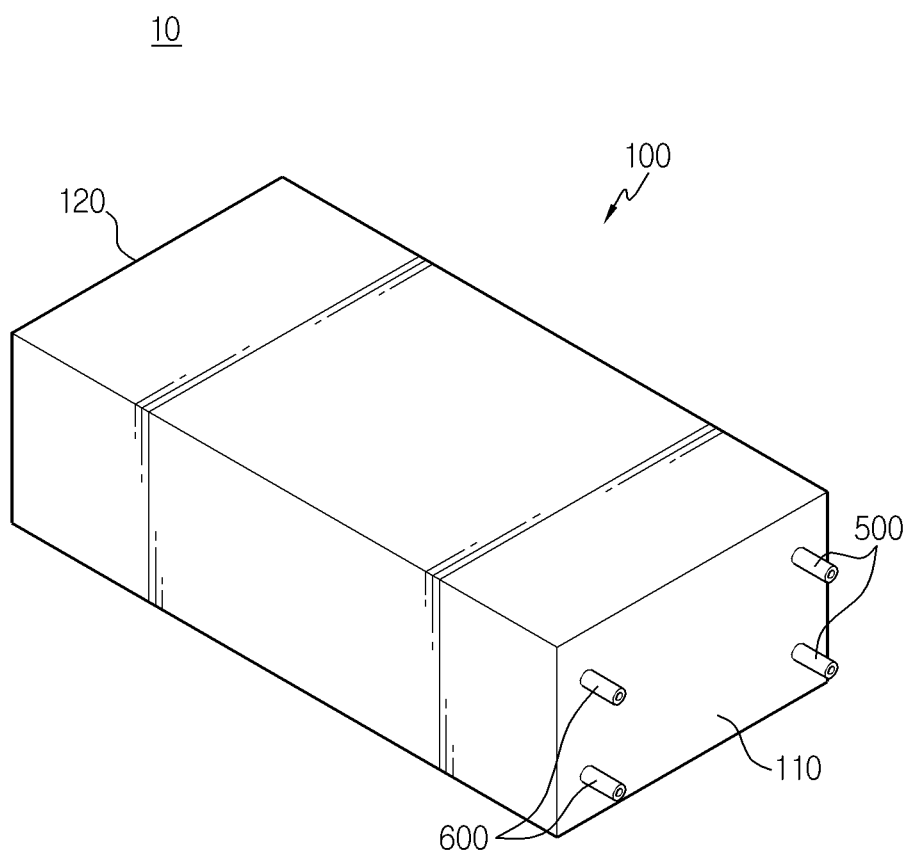
FIG. 6 is a perspective view showing an entire battery module according to the third embodiment of the present disclosure.

FIG. 6 is a perspective view showing an entire battery module according to the third embodiment of the present disclosure.

Hereinafter, the function and effect of a battery module 10 according to the third embodiment according to the present disclosure will be described with reference to the drawings, but features common to the battery module 10 according to the first and second embodiments of the present disclosure will not be described again in detail.

The third embodiment of the present disclosure is different from the first and second embodiments in the point that the inlet 500 and the outlet 600 formed at the case 100 are provided in plural.

Since the cooling oil 400 is a fluid, if the inlet 500 and the outlet 600 are formed in single, the cooling oil 400 may not smoothly circulate depending on the size of the case 100, or turbulence may be generated in the flow of the cooling oil 400 inside the case 100. In order to solve this problem, a plurality of inlets 500 and outlets 600 may be formed at the case 100. For example, as shown in FIG. 6, the inlet 500 and the outlet 600 are provided in plural, respectively, and they may be formed vertically based on FIG. 6. Even though two inlets 500 and two outlets 600 are provided in FIG. 6, more inlets 500 and outlets 600 may be used as necessary, without being limited to the above. In addition, the arrangement of the inlet 500 and the outlet 600 is not limited to the vertical form but may be provided in more various ways.

Meanwhile, a battery pack (not shown) according to an embodiment of the present disclosure, may include one or more battery modules 10 according to an embodiment of the present disclosure as described above. Also, in addition to the battery modules 10, the battery pack (not shown) may further includes a case 100 for accommodating the battery modules 10, and various devices for controlling charge and discharge of the battery modules 10, such as a BMS, a current sensor, a fuse, and the like.

Meanwhile, a vehicle (not shown) according to an embodiment of the present disclosure may include the battery module 10 or the battery pack (not shown) described above, and the battery pack (not shown) may include the battery module 10. In addition, the battery module 10 according to an embodiment of the present disclosure may be applied to the vehicle (not shown), for example, a predetermined vehicle (not shown) provided to use electricity like an electric vehicle or a hybrid electric vehicle.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

INDUSTRIAL APPLICABILITY

The present disclosure is directed to a battery module and a battery pack including the battery module, and is particularly applicable to industries associated with a secondary battery.

What is claimed is:

1. A battery module, comprising:
    a case having a wall disposed therein to form a channel along which a fluid circulates, an inlet, and an outlet;
    a plurality of battery cells disposed in the case, wherein the wall is disposed between a pair of neighboring battery cells among the plurality of battery cells, and the fluid flows in through the inlet of the case, circulates between the plurality of battery cells along the wall, and flows out through the outlet of the case; and
    a connection member configured to connect the neighboring battery cells on opposite sides of the wall to each other, the connection member having a rounded portion at a region that comes into contact with the fluid, and the rounded portion being opposite a free end of the wall.

2. The battery module according to claim 1,
    wherein the wall includes a first wall extending from a first side of the case and spaced apart from a second side of the case, the second side being opposite to the first side.

3. The battery module according to claim 2,
    wherein the wall includes a second wall extending from the second side of the case and spaced apart from the first side of the case.

4. The battery module according to claim 3,
    wherein the first wall and the second wall are spaced apart by a preset gap.

5. The battery module according to claim 3,
    wherein the first wall and the second wall are provided in plural, and
    wherein the first walls and the second walls are disposed alternately.

6. A battery pack, comprising the battery module defined in claim 1.

7. A vehicle, comprising the battery module defined in claim 1.

8. The battery module according to claim 1, wherein the connection member is spaced from the case.

9. The battery module according to claim 1, wherein each of the neighboring battery cells includes a first surface in direct contact with the wall and a second surface opposite the first surface such that the fluid contacts the second surface.

10. A battery module, comprising:
    a case having a wall disposed therein to form a channel along which a fluid circulates, an inlet, and an outlet; and
    a plurality of battery cells disposed in the case, wherein the wall is disposed between a pair of neighboring battery cells among the plurality of battery cells, and the fluid flows in through the inlet of the case, circulates between the plurality of battery cells along the wall, and flows out through the outlet of the case,
    wherein each of the neighboring battery cells has a first surface in direct contact with the wall and a second surface opposite the first surface such that the fluid contacts the second surface.

* * * * *